United States Patent
Fletcher

(12) 
(10) Patent No.: US 6,897,593 B1
(45) Date of Patent: May 24, 2005

(54) ARMATURE FOR AN ACTUATOR

(75) Inventor: Matthew David Fletcher, Royston Herts (GB)

(73) Assignee: Ling Dynamic Systems, Ltd., Royston Herts (GB)

(*) Notice: Subject to any disclaimer, the term of this patent is extended or adjusted under 35 U.S.C. 154(b) by 0 days.

(21) Appl. No.: 10/701,559

(22) Filed: Nov. 6, 2003

(51) Int. Cl.[7] .............................................. H02K 1/00
(52) U.S. Cl. ........................ 310/195; 310/198; 310/212
(58) Field of Search ................................. 310/195–200, 310/212, 179

(56) References Cited

U.S. PATENT DOCUMENTS

| | | | | |
|---|---|---|---|---|
| 4,026,142 A | * | 5/1977 | Jacobs | ........................ 73/578 |
| 4,908,536 A | * | 3/1990 | Hudimac | ...................... 310/51 |
| 5,969,464 A | * | 10/1999 | Nakano et al. | ............. 310/328 |

* cited by examiner

Primary Examiner—Thanh Lam
(74) Attorney, Agent, or Firm—Baker & Hostetler LLP

(57) ABSTRACT

An armature for an actuator for applying vibration to a body along an axis, the armature having at least two parallel wound helical windings on the axis, and a terminal arrangement connected to the ends of the windings for selective connection of the windings to two external A.C. drivelines, the terminal arrangement being switchable between a relatively low impedance mode, with at least two of the windings connected electrically in parallel, and a relatively high impedance mode, with two of the windings or two groups of parallel-connected windings connected in series.

20 Claims, 4 Drawing Sheets

ARMATURE FOR AN ACTUATOR

FIELD OF THE INVENTION

This invention relates to armatures for electromagnetic actuators, also known as vibrators, for applying shock vibration to a body along an axis. The applied force may impose translation movement on the body or may counteract motion of the body. The present invention has particular application to the vibration testing of equipment, apparatus and components from various fields including the aerospace, automotive and electronics industries.

BACKGROUND OF THE INVENTION

In the field of vibration testing, electromagnetic actuators, also called shakers, are typically used in the production environment to test items at varying levels of force, velocity and displacement and over varying periods of time.

Some shakers are constructed to apply low levels of force over relatively short periods of time while others are made for more extreme conditions, such as are necessary for shock testing. To be suitable to test items under heavy loads and at very high stress levels over long continuous periods, shakers must be extremely robust and highly reliable.

Examples of known air-cooled electromagnetic actuators are the applicant's existing V830, V850, V875 and V895 models. FIG. 1 illustrates a general construction of such an actuator. The armature 1 is adapted to vibrate relative to the body or stator 2 and is suspended from the stator by suspension members 7. The armature 1 includes armature coil 4 which is located in an annular air gap 3. Two electromagnets, 3a running in opposition are provided which generate D.C. magnetic fields across the air gap to supply the motive force. The coil 4 is energised by an alternating current so that it moves relative to the stator 2, causing the armature 1 to vibrate at the frequency of the applied alternating current. An article to be vibration tested may be placed directly on top of the armature normal to its axis of vibration, or on a work table carried by the armature. Alternatively, the article to be tested may be placed on a horizontal table coupled to the armature when horizontal vibration testing is to be carried out. An example of such horizontal vibration testing is described in U.S. Pat. No. 4,489,612.

In a shock test, a half wave pulse such as a square or sine wave is applied with a pulse width of typically 1 to 25 ms. The maximum level of shock is limited by one of three factors, depending on the pulse width. For low frequency testing, at pulse widths longer than for example 18 ms, the limit tends to be set by the maximum possible displacement of the armature assembly within the actuator. At medium frequencies of testing, the limit tends to be set by the maximum supply voltage, which depends on the performance of the power amplifier supplying the vibrator. This voltage limitation typically occurs for pulse widths of 5 to 18 ms. High frequency testing tends to be limited by the maximum current that the amplifier can supply, and this limitation typically occurs for pulse widths less than 5 ms.

High frequency performance can be improved by increasing the current output of the amplifier. Typically amplifiers have power modules which may be connected in parallel, and the current can be increased almost indefinitely by multiplying the number of power modules. However, the maximum supply voltage from such a parallel arrangement remains unchanged.

Enhancing the system performance for a specific range of voltage-limited shock tests can be achieved using dedicated armatures, with special windings. Thus the armature winding has to be selected to suit the type of body to be tested by the vibration, and to suit the frequency and amplitude of vibration.

An alternative solution to the voltage limitation that has been proposed is to use matching transformers, but these are expensive. Accordingly, the purpose of the invention is to find an economic solution to the voltage limitation.

SUMMARY OF THE INVENTION

The invention provides an armature for an actuator for applying vibration to a body along an axis, the armature having at least two parallel wound helical windings on the axis, and a terminal arrangement connected to the ends of the windings for selective connection of the windings to two external A.C. drivelines, the terminal arrangement being switchable between a relatively low impedance mode, with at least two of the windings connected electrically in parallel, and a relatively high impedance mode, with two of the windings or two groups of parallel-connected windings connected in series.

The invention also provides an electromagnetic actuator for applying vibration to a body along an axis having a stator and an armature in accordance with the invention.

Further, the invention provides a method of altering the impedance of the windings of an armature having a plurality of windings wound parallel, comprising changing the interconnections between the ends of the windings to provide selectively parallel winding connection or series connection of two windings or of two groups of parallel-connected windings.

Further, the invention provides an armature for an actuator for applying vibration to a body along an axis, the armature having at least two parallel wound helical windings on the axis, and means for selective connection of the windings to two external A.C. drivelines, the selective connection means being switchable between a relatively low impedance mode, with at least two of the windings connected electrically in parallel, and a relatively high impedance mode, with two of the windings or two groups of parallel-connected windings connected in series.

The invention arose from an appreciation that it might be possible to select different winding impedances in a standardised actuator The invention allows the ends of the windings to be connected in different ways to provide different impedances as seen by the external power supply, and this allows the user of the equipment to optimise the voltage, and thus the performance of the electromagnetic actuator for vibration testing particularly in the voltage limited region of pulse widths from typically 5 to 18 ms. It allows a standard actuator to be adjusted, for example manually, to suit the requirements of particular test procedures. The invention thus overcomes the previous problem of having to provide a range of specially made armatures suiting a variety of different voltage limited shock tests.

BRIEF DESCRIPTION OF THE DRAWINGS

In order that the invention may be better understood, a preferred embodiment will now be described, with reference to the accompanying drawings, in which.

DESCRIPTION OF PREFERRED EMBODIMENTS

Figure 1:
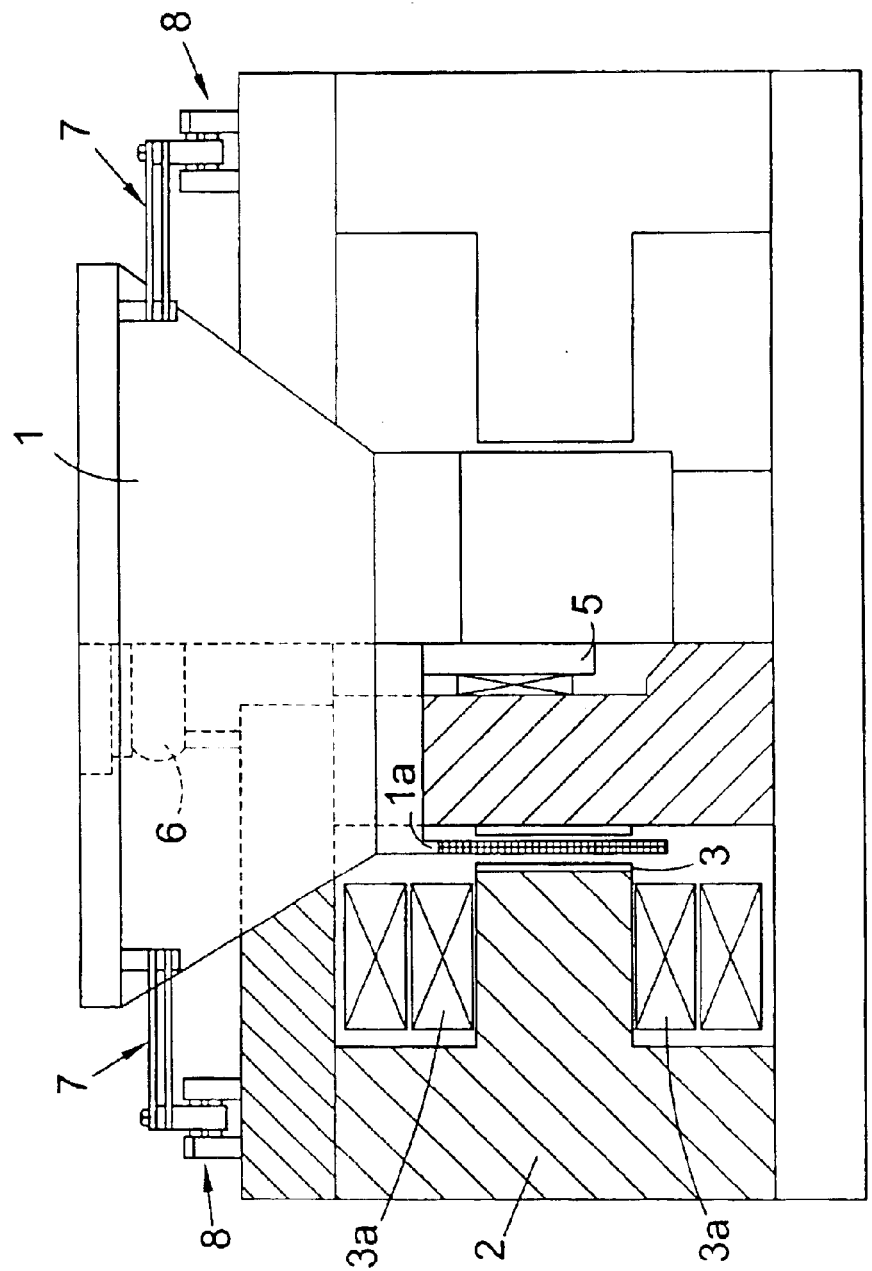
FIG. 1 is a side elevation, partly in section, of a known electromagnetic actuator.

Referring to the drawings, the electromagnetic vibration generator illustrated is described fully in U.S. Pat. No. 5,351,545 and comprises an armature 1 mounted for vibratory movement relative to a rigid stator or body 2. The latter is provided with trunnions (not shown) by which it may be supported in a rigid frame so that the vibration generator can be oriented either for vibration along a vertical axis or along a horizontal axis. As seen in FIG. 1, the body is provided with an annular air gap 3 across which is produced a D.C. magnetic field generated by electromagnets 3a, and within which is located a coil 4 attached to the lower end 1a of the armature structure. As is well known in the art, energisation of the armature coil 4 by an alternating current causes the armature 1 to vibrate relative to the body 2, along its longitudinal axis at the frequency of alternating current applied to the coil 4. The armature 1 is mounted on an axially located bearing 5, for example a hydrostatic bearing or re-circulating ball bushing, which allows free movement of the armature along its vibratory axis but which restrains lateral movement of the armature. In this embodiment the armature is also supported by an air bag 6.

The periphery of the armature 1 is suspended from the body 2 by flexure members 7 each of which has an outer end connected to anchoring brackets 8 mounted on the body 2. This arrangement serves to centre the armature coil 4 in the air gap 3 and also allows free movement of the armature along its axis of vibration but imparts a high stiffness to any lateral movement of the armature. In this embodiment four such flexure members are disposed equiangularly about the periphery of the armature.

The armature 1 has just one coil 4.

In an alternative actuator, not shown, there are two co-axial, axially displaced coils on the armature.

The armature 1 will vibrate upon energisation of the armature coil 4 with an alternating current and this energisation causes relative translation motion between the armature 1 and the stator 2 along the armature's longitudinal axis at the frequency of the alternating current.

The present invention is applicable to the actuator of any such arrangement, whether there is just one coil (with one or more windings) or two axially spaced coils (which could be energised by equal and opposite alternating currents, and for which there would be only one D.C. stator coil between them).

Figure 2:
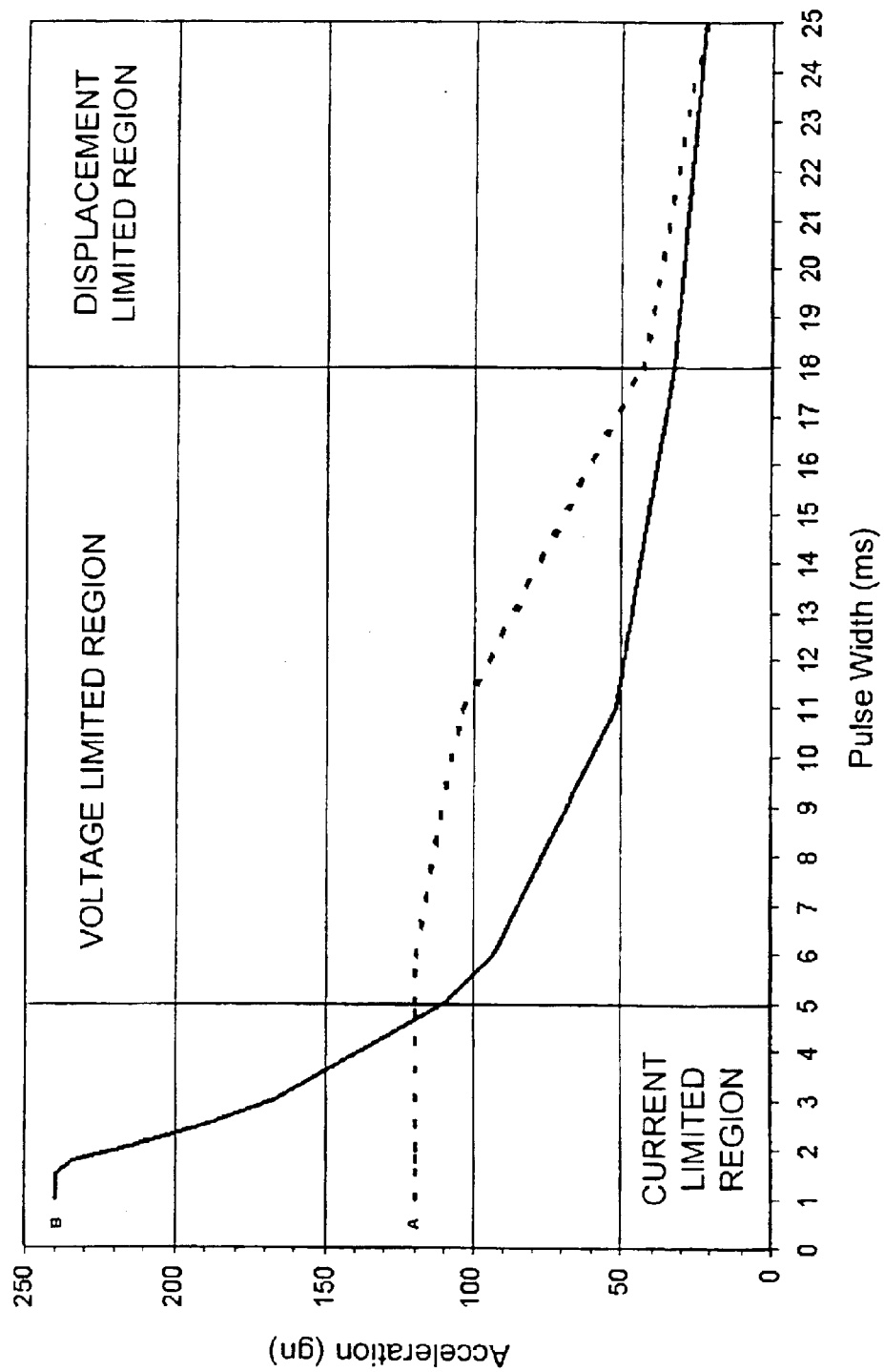
FIG. 2 is a graph of armature acceleration against pulse width to illustrate the performance of the actuator.

With reference to FIG. 2, the performance of a typical single armature in an electromagnetic actuator is shown with reference to the acceleration of the armature, in units of the acceleration due to gravity, against the pulse width, in milliseconds, of the alternating drive signal applied to the windings of the armature. In the current-limited region, from 0 to about 5 ms, the performance of the actuator can be selected by increasing or decreasing the current from the supply amplifier. Graph B shows the performance of an existing actuator, with a conventional winding arrangement. In order to improve its voltage limit, its impedance may be halved, approximately, by changing the conventional winding to a "shock winding" arrangement in which there is half the number of turns in the winding. The performance of the shock winding is shown in graph A. It can be seen that the improvement is greater in the voltage limited region using the shock winding, but that this leads to a large drop in performance in the current limited region, requiring compensation. This could for example be improved by providing extra parallel windings.

The winding of an actuator embodying the invention will now be described with reference to FIGS. 3a and 3b. The armature assembly of the actuator of an air-cooled vibration generator comprises a coil wound onto an armature frame. Two wires 401, 402 are wound between positive and negative external terminals. The individual wire 401 has ends connected to fixed terminal points T1 and T3, and the other individual wire 402 has ends connected to fixed terminal points T2 and T4. Points T1 to T4 are fixed on a terminal assembly shown in different configurations in FIGS. 4a and 4b described below in greater detail. The terminal assembly is secured rigidly to the armature.

The wires 401, 402 are wound in parallel, one above the other, adjacent in the direction of the longitudinal axis of the armature, and in a helical pattern on the same axis. Thus the turns of the individual wires alternate along the axis of the helix. This forms one layer of a winding, and for some purposes this is sufficient. However, in the example described, each individual wire continues to form a further helical winding, in a helix concentric with the first helix. Thus each winding is wound in two concentric overlapping helices, in the same rotational sense over both helices. This provides double the number of turns in each winding, without needing to double the axial length of the coil.

In other coil configurations, it is possible to provide more than two individual wires, and they may also be wound in parallel so that they are all adjacent in the direction of the axis. In conventional terminology, this is called winding with two in hand, or four in hand, or eight in hand, etc.

The wire used in the armature coil is extruded pure aluminium with a pure copper coating, 15% by volume. The wire is formed in a two-stage process, firstly being extruded to a size during which the copper is applied, and then electrically insulated with a polyamide or polyimide enamel complying with British Standard BS6811 Section 4:2Class 200. In one example, the wire dimensions are 2.82 mm by 5.44 mm, and the wire is wound with the surfaces of larger dimension facing each other. Thus the length of the coil along the axis is the number of turns times the width of the wire (for example 2.82 mm) times the number of wires in parallel (in hand).

The armature coils are wound directly onto the armature frames by fixing a winding bobbin of a controlled length to the inner diameter of the armature frame, and rotating the assembly by means of a low speed drive. The winding wire or wires are fed onto the rotating assembly from the individual drums. To achieve a shock wind, with fewer turns, more wires are fed onto the bobbin at once than are normally used. This effectively doubles the width of the conductor formed from the multiple wires. As a result, the helix angle of the wind is multiplied by the number of wires used.

In the example described, with two layers, the coil is manufactured by winding the wires together in a helix in a first direction, along the axis, and then reversing the direction along the axis after a predetermined number of turns has been completed, winding it back over itself at a different radius. It will be appreciated that each individual wire has to be fed back through the first formed coil, so that both ends of the wire can emerge outside the overall winding for connection to the terminal points.

A strengthening material is included between the two layers of the winding, and the coil structure as a whole is saturated in resin.

Figure 3A:
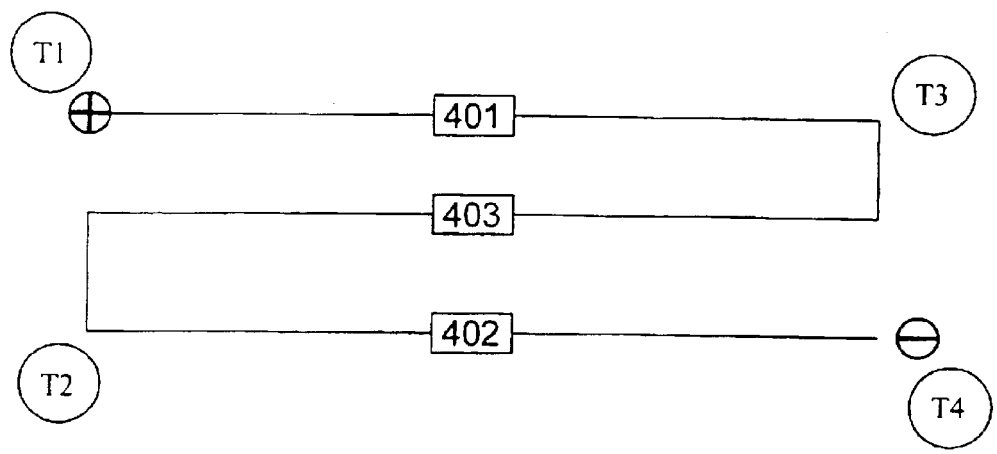
FIGS. 3a and 3b are wiring diagrams for different impedance modes of connection of an actuator embodying the invention.
Figure 3B:
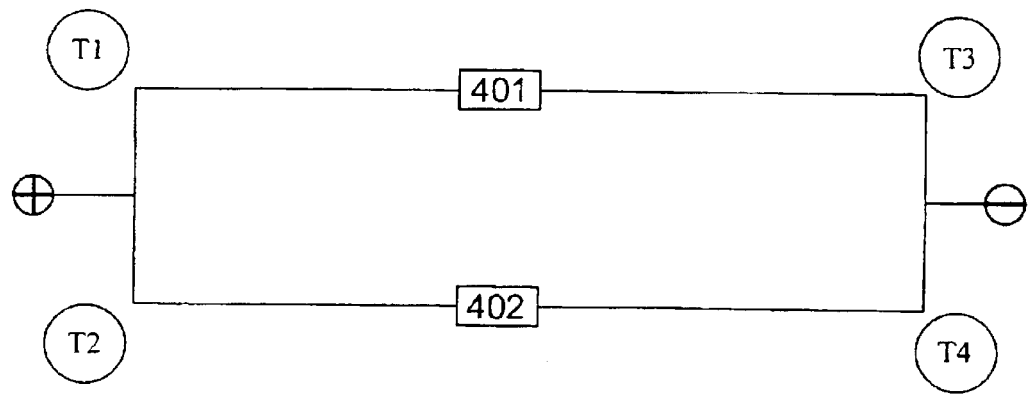

With further reference to FIGS. 3a and 3b, and in accordance with the invention, the two wires may be connected in two different possible ways, to achieve different selective impedances. In the low impedance mode configuration of FIG. 3a, terminals T1 and 12 are interconnected and connected to the positive supply terminal, and terminals T3 and T4 are interconnected and connected to the negative supply terminal. In use, the supply terminals are connected by cables to the amplifiers of a power supply, for alternating current drive at the required voltage and current and with the required waveform. In one range of amplifiers produced by the applicant for this purpose, known as SPA, there are a number of power modules, each providing 8 kVA. The power modules can supply a maximum rms voltage of 100 volts, although short tests can usually be run up to the peak level, i.e. 141 volts, due to the short duration of the test. One vibrator produced by the applicant, known as V8-440, usually uses a 56 kVA variant of the SPA amplifier, which contains seven modules each of 8kVA, providing an rms current limit of 560 amps. For short periods required by shock tests, these amplifiers can supply about three times their current rating, i.e. 1680 amps. Generally speaking, for this purpose, the power supply will operate with a maximum voltage of between 50 volts and 1000 volts, and a maximum current of greater than 100 amps, preferably greater than 500 amps, and typically between 100 and 1000 amps.

With the windings set in the alternative, high impedance mode configuration shown in FIG. 3b, terminals T2 and T3 are inter-connected by means of a conductor 403, and terminals T1 and T4 respectively are connected to the external positive and negative supply lines. The effect of this is to arrange the individual wires 401 and 402 in series, instead of in parallel. This doubles the number of turns in the overall winding, and doubles the effective length of the winding. This is achieved without making any change to the winding itself: only by changing the connections of the terminal assembly. The advantage of this is that a single design of armature can be provided to suit the dual purpose. Depending on the nature of the testing required with the armature, and with reference to the graph of FIG. 2, the performance of the different impedance mode configurations of FIGS. 3a and 3b will correspond to the graphs A and B, and the configuration may be switched appropriately during testing procedures. There is no need to create specially-wound armatures.

By way of background, shakers are most commonly used for testing in Sine or Random. Sine is usually in the form of 'swept sine' i.e. with the drive frequency increasing or decreasing at constant amplitude between two set frequencies, and Random which could be any frequency at any time (rather like white noise)—the RMS level being the controlled test level. It Is also possible to combine both of these types of test in a complex waveforn.

It is the intention that for all Sine and Random running the armature coil is connected in the higher impedance mode It is not currently intended to run the shaker in Sine or Random whilst connected in the lower impedance mode as the changes greatly affect the characteristics of the shaker. There is however potential for this in the future.

The switching between the impedance modes will now be described with reference to FIGS. 4a and 4b. These illustrate the terminal assembly which has typically a rectangular base plate (not shown) which is connected rigidly to the outer side wall of the stator body 2, typically around half way up. The ends of the wires 401, 402 are connected at the terminals T1 to T4 respectively at bolts AC1+, AC2+, AC2− and AC1− respectively. Bolts A1+and A2− are permanently connected respectively to bolts AC1+ and AC1−, and allow for the removable connection of cables for the positive and negative power supply. Connectors may be placed over the bolts, as appropriate, and the connection may be secured by means of the nuts as shown.

Figures 4A, 4B:
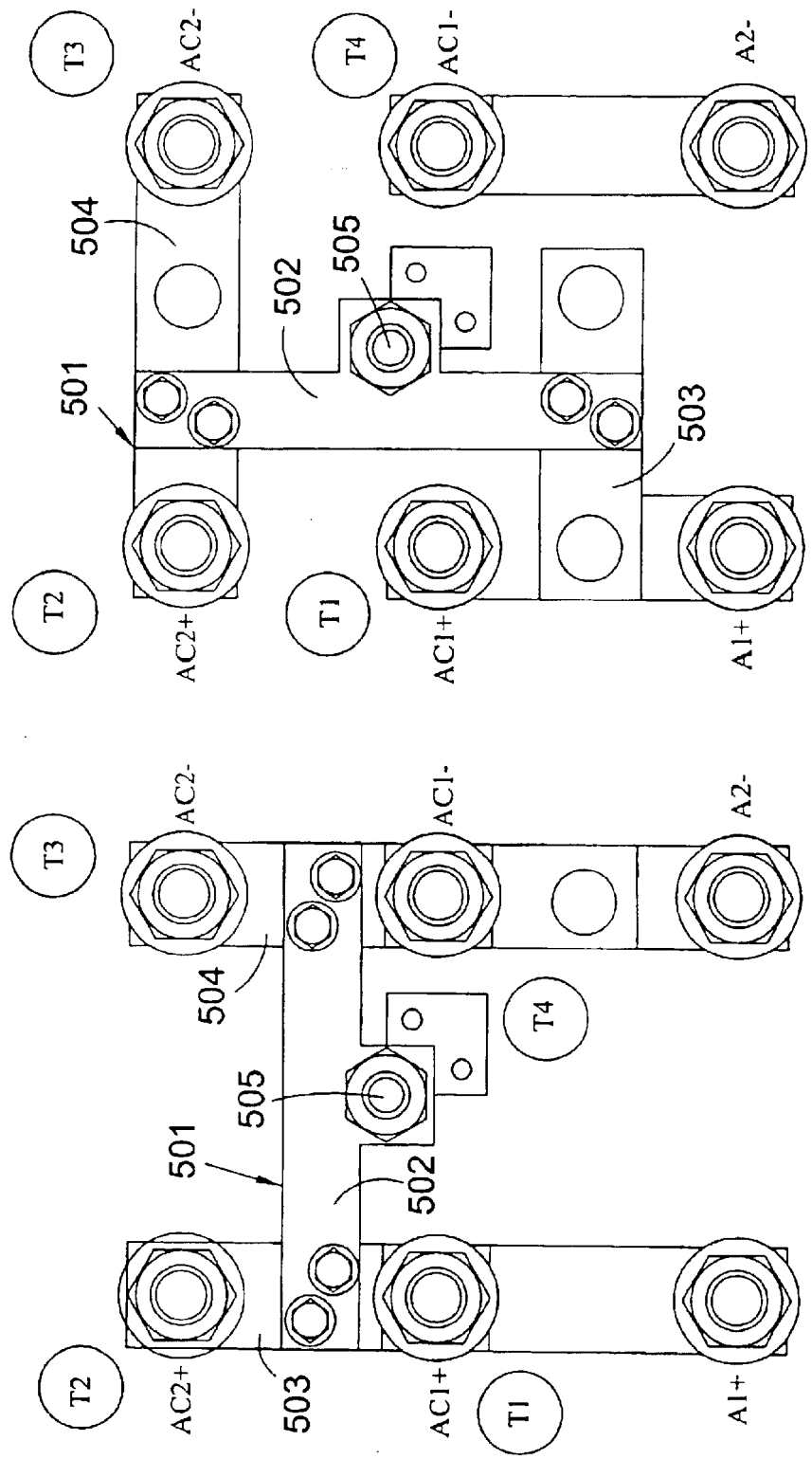
FIGS. 4a and 4b are elevational views of a terminal arrangement on an actuator embodying the invention, and connected to provide the wiring arrangements respectively of FIGS. 3a and 3b.

A I-shaped conductive connector 501 is mounted pivotally for free rotary movement on a bolt 505 at the centre of the terminal assembly, so that it may rotate a quarter turn between its positions as shown in FIGS. 4a and 4b. The connector 501 comprises a non-conductive bar 502 which holds at opposite ends a pair of conductive bus bars 503 and 504. Conductive bars 503 and 504 are formed for the selective interconnection of the bolts at the terminal points T1 to T4. In FIG. 4a, which corresponds to the connection of FIG. 3a and low impedance mode, bar 503 interconnects terminals T1 and T2, and bar 504 interconnects terminals T3 and T4 For the higher impedance mode shown in FIG. 4b, bar 504 interconnects terminals T2 and T3, and corresponds to the connector 403 shown schematically in FIG. 3b. Connector bar 503 is redundant in this configuration.

Switching between the impedance modes is achieved manually by removing the appropriate nuts from the bolts, lifting and rotating the conductive connector 501, lowering it in place, and replacing the nuts securely. The spacings between the bolts and the terminal points are selected so that at its two positions the conductive connector, which forms a switch assembly, is aligned respectively with different terminals for establishing the different modes of connection. A terminal panel cover (not shown) protects the terminal assembly and provides electrical insulation for operator safety. This cover is interlocked with a switch in the remote power supply, which prevents the system being switched on when the cover is removed.

It will be appreciated that a corresponding switch assembly would be provided for a coil in which there are for example four or eight wires wound in parallel. Depending on the performance required, in a four-wire coil, two of the wires may be connected in parallel and two others of the wires may be connected in parallel with those two pairs being connected in series. This would provide approximately double the impedance of the alternative configuration in which all four wires are connected electrically in parallel. Alternatively, the arrangement could be such that all four wires may be connected in series, to provide four times the impedance. In an eight wire coil, the possibilities for different parallel and series electrical connections are correspondingly greater, there may for example be a series connection between two groups of four wires connected in parallel. Alternatively, there may for example be four groups of two parallel-connected wires all connected in series. It would be preferred that each given coil arrangement has only two selectable impedance modes, switchable manually using a bus bar arrangement analogous to that shown in FIG. 4. However, it is conceivable that a given coil arrangement may be selectively switched between four or more different impedance configurations.

The invention is applicable to alternative embodiments, in which one, two or even more layers of helical windings are provided; in which different structures are provided for the armature and actuator; and in which different shapes, sizes and materials of the windings are used.

Whilst we consider that there would be practical difficulties in terminating water-cooled coils in accordance with the invention, due to the high pressure and the need for insulation, it is conceivable that such difficulties might be overcome, so the invention is not limited to air-cooled arrangements in principle. A water-cooled shaker is described in our GB-A-2385470, for example.

Further, it is not necessary for the mode switching to be done manually, and instead there could be electric switches in the terminal assembly, switched automatically from the external power supply control system. These switches could selectively interconnect the winding terminal points, in place of bus bars.

In use, an operator may alter manually the impedance of the windings of the armature by changing the interconnections between the ends of the windings, between arrangements as illustrated by way of example in FIGS. 4a and 4b, to provide selectively parallel windings connection or series connection of two windings or two groups of parallel-connected windings. The selective alteration of impedance is preferably provided manually using electrical conductors such as bus bars, between the terminals connected to the winding ends, as described by way of example only in FIGS. 3 and 4.

What is claimed is:

1. An armature for an actuator for applying vibration to a body along an axis, the armature comprising:

at least two parallel wound helical windings on the axis, and a terminal arrangement connected to the ends of the windings for selective connection of the windings to two external A.C. drivelines, the terminal arrangement being switchable between a relatively low impedance mode, with at least two of the windings connected electrically in parallel, and a relatively high impedance mode, with two of the windings or two groups of parallel-connected windings connected in series.

2. The armature according to claim 1, in which there are two windings, and the terminal arrangement connects them in parallel or in series in the low and high impedance modes respectively.

3. The armature according to claim 1, in which there are four windings, and the terminal arrangement connects them all in parallel, or two parallel-connected pairs in series, in the low and high impedance modes respectively.

4. The armature according to claim 1, in which there are eight windings, and the terminal arrangement connects them all in parallel, or parallel-connected pairs in series, in the low and high impedance modes respectively.

5. The armature according to claim 1, in which at least one of the windings is wound in two concentric overlapping helices, in the same rotational sense over both helices.

6. The armature according to claim 1, in which at least two of the windings are adjacent in the direction of the axis and are wound together in a helix on the axis.

7. The armature according to claim 1, in which the terminal arrangement comprises terminals for the ends of corresponding windings, and conductive connectors which are movable between the terminals for the ends of the windings to provide selective electrical connections.

8. The armature according to claim 7, in which the conductive connectors are bars which are connectable manually and removably to the terminals.

9. The armature according to claim 8, in which the bars are connectable by nuts and bolts.

10. The armature according to claim 8, in which the bars are permanently interconnected by a non-conductive arm to form a switch assembly.

11. The armature according to claim 10, in which the switch assembly is mounted on the actuator and is pivotable between two positions at which the bars are aligned respectively with different terminals for establishing the different impedance modes.

12. The armature according to claim 10, in which the switch assembly comprises terminals for connection to the external A.C. drivelines, those terminals being permanently connected to the ends of at least two different windings.

13. The armature according to claim 1, in which the actuator has a stator body and the terminal arrangement is mounted on the stator body.

14. The armature according to claim 1, wherein the actuator is electromagnetic and includes a stator.

15. The armature according to claim 14, comprising a power supply connected to the terminal arrangement by external A.C. drivelines.

16. A method of altering an impedance of windings of an armature having a plurality of windings wound in parallel, comprising changing interconnections between ends of the windings to provide at least one of selectively parallel winding connection, series connection of two windings, and of two groups of parallel-connected windings.

17. The method according to claim 16, in which the process of changing the interconnections comprises manually removing and re-applying electrical conductors between terminals connected to the winding ends.

18. An armature for an actuator for applying vibration to a body along an axis, the armature comprising:

at least two parallel wound helical windings on the axis, and means for selective connection of the windings to two external A.C. drivelines, the selective connection means being switchable between a relatively low impedance mode, with at least two of the windings connected electrically in parallel, and a relatively high impedance mode, with two of the windings or two groups of parallel-connected windings connected in series.

19. The armature according to claim 18, wherein the actuator is electromagnetic and includes a stator.

20. The armature according to claim 18, wherein at least one of the windings is wound in two concentric overlapping helices, in the same rotational sense over both helices.

* * * * *

UNITED STATES PATENT AND TRADEMARK OFFICE
CERTIFICATE OF CORRECTION

PATENT NO. : 6,897,593 B1 Page 1 of 1
DATED : May 24, 2005
INVENTOR(S) : Matthew David Fletcher It is certified that error appears in the above-identified patent and that said Letters Patent is hereby corrected as shown below:

Title page,
Item [56], References Cited, FOREIGN PATENT DOCUMENTS, please add reference -- Patent No. 736,631 dated 09/1955 Great Britain class 35 --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,897,593 B1
DATED : May 24, 2005
INVENTOR(S) : Matthew David Fletcher It is certified that error appears in the above-identified patent and that said Letters Patent is hereby corrected as shown below:

<u>Title page,</u>
Item [56], References Cited, FOREIGN PATENT DOCUMENTS, please add reference
-- 736,631    09/1955    Great Britain    35 --.

Signed and Sealed this

Twenty-fifth Day of October, 2005

JON W. DUDAS
*Director of the United States Patent and Trademark Office*